April 21, 1970          A. M. WHITE          3,507,308

MATERIAL TESTER FILLER UNIT

Filed May 29, 1967

Allwyn M. White,
INVENTOR.

BY.

ATTORNEY.

United States Patent Office 3,507,308
Patented Apr. 21, 1970

3,507,308
MATERIAL TESTER FILLER UNIT
Allwyn M. White, Danbury, Conn., assignor to Automation Industries, Inc., El Segundo, Calif., a corporation of California
Filed May 29, 1967, Ser. No. 641,785
Int. Cl. B65b *31/00;* B67c *3/00*
U.S. Cl. 141—7                                    10 Claims

ABSTRACT OF THE DISCLOSURE

The present invention relates to wheel type search units for ultrasonic nondestructive testing systems. In search units of this type one or more ultrasonic transducers are mounted on an axle and surrounded by a resilient tire filled with an ultrasonic liquid couplant. The invention contemplates the removal of all foreign substances such as solid particles, gas bubbles, etc., from the liquid couplant whereby a more effective coupling is obtained between the transducers and the workpiece. This is accomplished by heating the liquid and subjecting it to a vacuumn until all of the gases, etc., are removed from the liquid whereby no bubbles can develop within the search unit after it has been filled.

---

In ultrasonic nondestructive testing systems ultrasonic energy is transmitted into the workpiece and the manner in which this ultrasonic energy reacts with the workpiece permits a determination to be made of the various characteristics of the workpiece. The ultrasonic energy is normally absorbed by air. In fact, even extremely thin layers of air will cause the energy to be completely absorbed. Therefore, to insure an effective transfer of energy between the transducer and the workpiece it is necessary for the path between the transducer and the workpiece be free of any air or other gases. One means of accomplishing this is to utilize a couplant such as water or oil between the interfaces. If a large area of a workpiece is to be scanned at a high rate of speed a so-called wheel search unit such as disclosed in U.S. Patents 2,505,867 and 3,257,843 may be used.

In a wheel type search unit of this nature the transducer is mounted on and carried by an axle in the wheel. A resilient tire is rotatably mounted on the axle so as to surround the transducer. As the search unit advances across the workpiece the tire rolls across the surface. The wheel is filled with a liquid couplant such as water or oil whereby the ultrasonic energy may travel freely between the transducer and the flat formed in the tire at the area where it contacts the surface of the workpiece.

Although a search unit of this nature is very useful it has been found that liquid couplant must be very clean. Even very minute solid particles or gas bubbles are effective to absorb and/or reflect substantial amounts of ultrasonic energy. Moreover even air which is dissolved in the liquid tends to produce the same effect. This, of course greatly degrades the results of any tests.

Heretofore, it has been necessary to employ extreme care when filling the wheel with a liquid couplant to avoid any air being present inside of the wheel after it has been filled. Normally this has been accomplished by over filling the wheel with a surplus of couplant. The tire, wheel, etc. have then been manually manipulated to force all of the air and surplus couplant from the wheel. This has been a slow and difficult process requiring a considerable amount of time to complete. Moreover it has been found that after an apparently correctly filled search unit is allowed to stand for a while air which was originally entrained or dissolved in the couplant separates from the couplant and produces bubbles. When this occurs it is necessary to refill the search unit. It will thus be seen that although liquid filled wheel search units are very effective devices, they have been very difficult to manufacture, service and use.

The present invention provides means for overcoming the foregoing difficulties. More particularly the present invention provides means for substantially automatically filling a wheel search unit with a liquid couplant in a very short interval of time. Moreover the search unit is correctly filled with a liquid couplant free from any foreign materials such as solid particles, gas, bubbles, etc.

In the single embodiment of the invention disclosed herein this is accomplished by providing a tank for storing a liquid couplant suitable for filling the wheel search unit. Means are provided for simultaneously heating the couplant and subjecting it to a vacuum whereby any gas present in the liquid will be removed. In addition means are provided for removing all of the air from the wheel before any liquid couplant is circulated into the wheel. This insures the wheel being filled with a liquid which is free of any gases and which will not develop any gas bubbles if allowed to stand for extended periods of time.

These and other features and advantages of the present invention will become readily apparent from the following detailed description of one embodiment thereof, particularly when taken in connection with the accompanying drawings wherein like reference numerals refer to like parts and wherein.

Figure 1:
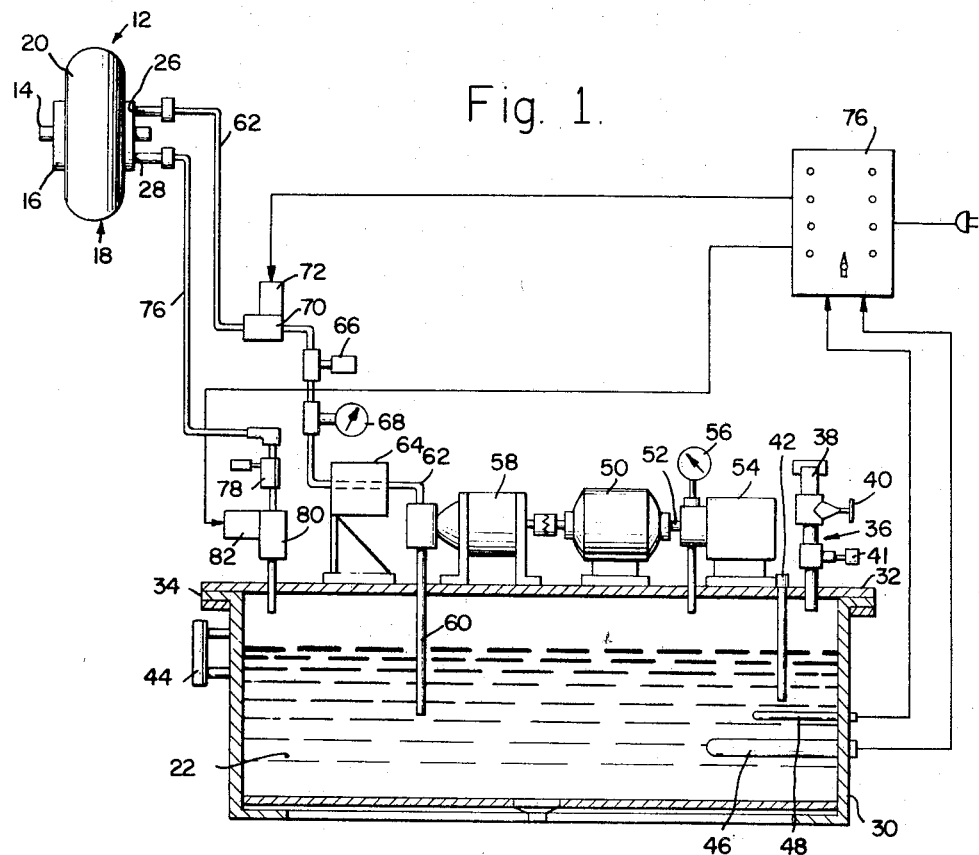
FIGURE 1 is a view of a system embodying the present invention and especially adapted for filling ultrasonic wheel search units having two parts with a liquid couplant.

Referring to the drawing in more detail the present invention is embodied in a filler 10 especially adapted to be utilized in filling ultrasonic wheel search units 12.

A wheel search unit 12 of this variety normally includes a non-rotating axle 14 adapted to be mounted on a support for driving the search unit 12 across the workpiece to be inspected. A hub 16 is rotatably mounted on the axle 14 and a tire 18 is mounted on the hub 16 so as to rotate therewith. The tire 18 is normally composed of a resilient or pliable material which is highly transparent to ultrasonic energy. It is also desirable for the tire 18 to be of an optically transparent or semi-transparent material, whereby the interior of the wheel 12 can be visually inspected. This will permit quickly observing any gas bubbles which may be present in the wheel 12. Although a wide variety of materials may be used polyurethanes, elastomers and similar substances have been found particularly well suited for this purpose. As the tire 18 rolls over the surface of the workpiece a "flat" is formed at the area of contact between the tread 20 and the workpiece.

One or more transducers are mounted on the axle 14 so as to be carried thereby. These transducers are capable of transmitting ultrasonic energy in response to electrical signals and to produce electrical signals in response to incident ultrasonic energy. The transducers are normally mounted in fixed or adjustable positions and aimed toward the flat. As a result the ultrasonic energy may be coupled through this flat area of contact between the search unit and the workpiece. In order to insure an efficient coupling between the tire and the workpiece a couplant such as water may be applied between the tread of the tire 20 and the surface of the workpiece as the search unit travels therealong.

In order to insure coupling between the transducers and the flat, the tire 18 is filled with a liquid couplant. This couplant is highly transparent to ultrasonic energy whereby the energy may travel from the transducers to the flat or from the flat to the transducer with a minimum amount of loss or acoustical mis-matching.

Although any desired type of couplant 22 may be employed (for example oils, glycerin, etc.) it has been found water mixed with ethylene glycol is a satisfactory and economical couplant. However, only very clean couplant should be employed. More particularly the couplant should be as free as possible of any foreign matter, such as solid particles or gas bubbles. Even though the particles or bubbles may be very small they absorb and/or reflect large amounts of ultrasonic energy. As a result the transmission of ultrasonic energy from the transducer to the workpiece and the return from the workpiece to the transducer is greatly reduced.

Figure 2:
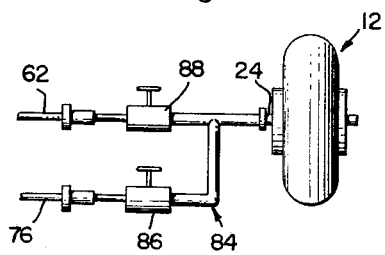
FIGURE 2 is a view of a wheel search unit with a single port and an adapter for use therewith.

As seen in FIGURE 1 a pair of ports 26 and 28 may be provided in the hub 16 of the wheel for filling and emptying the wheel. Alternatively as seen in FIGURE 2 a single valve or port 24 may be provided in the hub 16 for this purpose.

In order to fill the wheel search unit 12 the present filling apparatus 10 may be employed. This apparatus 10 includes a storage tank 30 capable of storing a couplant 22 such as water. The capacity of the tank 30 is not critical but it has been found preferable to include enough couplant to permit filling several of the search units 12 without refilling the tank at frequent intervals. By way of example the tank 30 may contain several gallons of couplant.

A cover 32 is provided for closing the tank 30. The cover 32 is preferably sealed as by a gasket 34 capable of withstanding a considerable amount of vacuum. An inlet 36 may be provided for filling the tank 30 without removing the cover 32. The inlet 36 includes a filler neck 38 having an air tight shutoff valve 40. In addition a vacuum relief valve 41 may be provided. To fill the tank 30 the relief valve 41 is opened to restore atmospheric pressure inside the tank 30. The shutoff valve 40 is then opened and the tank 30 filled with the couplant 22 to the desired level. A liquid level control 42 and/or sight gauge 44 may be provided to insure a proper filling of the tank 30.

An immersion type heater 46 may be provided within the tank 30 for heating the couplant 22. Preferably a thermostat 48 is provided in combination with the control box 50 to regulate the temperature of the couplant 22. Normally the temperature is maintained somewhat below the boiling point of the couplant 22. It is to be noted the boiling point is reduced materially because of the vacuum present within the tank 30. When the temperature of the couplant 22 is raised any gases present in the couplant will be driven off.

A drive motor 50 is provided for operating the various parts of the filler apparatus. This may be an electric motor mounted on the cover 32. One end of the drive shaft 52 is connected to a vacuum pump 54 having an intake opening into the top of the tank 30. This pump 54 is effective to remove the air and other gases above the couplant and create a substantial vacuum inside of the tank. A vacuum gauge 56 may be provided to indicate the amount of pressure present within the tank.

As the pump 54 reduces the pressure on the couplant to a sufficiently low level any gases present within the couplant will be removed. The combination of an elevated temperature produced by the heater element 46 and reduced pressure produced by the vacuum pump will drive substantially all of the gases out of the couplant 22. As a result, regardless of how long the couplant 22 is allowed to stand, gas bubbles will not develop within the couplant. Also, since the couplant is substantially completely devoid of any gases it does have an affinity for gases. Thus it can actually absorb a significant amount of air without any additional bubbles developing.

The second end of the driveshaft 52 is connected to a liquid pump 58. The intake 60 for the pump 58 extends through the cover and into the vicinity of the bottom of the tank 30. This will keep the intake 60 completely submerged in the liquid couplant 22 but will not suck foreign particles from the bottom.

The output of the pump 58 is connected to a discharge hose 62. This hose 62 is adapted to be coupled to the inlet port 26 in the search unit 12. A filter 64 may be provided in the hose 62 for removing any foreign solid particles. Although the filter 64 may be of any desired variety it has been found desirable to utilize replaceable cartridges capable of stopping particles as small as 5 microns.

A pressure relief valve 66 and pressure gauge 68 may also be provided in the hose 62. The relief valve 66 is effective to prevent damage to the search unit 12 as a result of over filling. It should also be capable of relieving excessive pressures in the tank 30 in the event the couplant 22 should boil while the vacuum pump 54 is not operating.

A control valve 70 may also be provided in the hose 62. This valve 70 may be manually operated. However, in the present instance it is operated by means of a solenoid 72. The solenoid 72 is interconnected with a control box 74. This control 74 is effective to automatically open and close the valve 70 whereby the couplant is allowed to flow through the hose 62 or is blocked.

A return hose 76 may also be provided for interconnecting with the outlet port 28. This hose 76 is connected to the tank 30 by means of a second pressure relief valve 78 and a valve 80 controlled by a solenoid 82. The solenoid 82 is also connected to the control box 74 so as to be automatically opened to interconnect the hose 76 with the tank 30 or close and isolate the hose 76 from the tank 30. The two hoses 62 and 76 are effective to interconnect the tank 30 with the two ports 26 and 28 while the two solenoids 72 and 82 are effective to operate the valves 70 and 80 and control the circulation of the couplant between the tank 30 and the search unit 12. In the event the search unit utilizes a single port 25 (as seen in FIGURE 2) an adapter 84 may be provided for interconnecting the two hoses 62 and 76 with the port 24. This adapter 84 includes a pair of control valves 86 and 88.

In order to utilize this invention for filling the double port wheel search unit 12 (FIGURE 1) the hoses 62 and 76 are coupled directly to the two ports 26 and 28 respectively. However before doing this the couplant 22 has normally been heated to an elevated temperature by the heater 46 and subjected to a vacuum by the pump 54 for a sufficient period of time to insure all of the gases being removed.

The control box 74 may then be actuated. The solenoid 82 is normally energized to initially open the valve 80. The valve 70 is normally maintained closed during this interval. The interior of the wheel is now exposed to the vacuum in the top of the tank 30 whereby the vacuum pump 54 will remove the air from within the wheel. Since the tire 18 is resilient it will be at least partially collapsed by the vacuum.

After the tire 18 has been deflated and substantially all of the air has been removed, the control box 74 may energize the solenoid 72 whereby the valve 70 is opened. This will allow the pump 58 to force liquid couplant through the filter 64 where any solid particles will be removed. The couplant will then flow through the port 26 and into the tire 18 and commence filling it.

Normally the valve 70 will remain open for a period of time such as several minutes. The couplant is thereby circulated through the wheel and returned to the tank 30 whereby any air which may have been left in the wheel will be removed. It has been found desirable to place the wheel 12 with the port 28 at the highest location. As a consequence any air bubbles will rise toward this port and be swept out of the tire 18 with the couplant 22 being returned to the tank 30 by the hose 76.

After this purging operation has continued for a sufficient time to remove all air from the wheel (for example a few minutes) the control box 74 actuates the solenoid 72 so as to close the valve 80. When this occurs the couplant 22 will no longer escape from the wheel and the tire will become inflated by the couplant 22. The relief valve 66 will protect the tire 18 against over filling. After the tire is fully inflated to the correct pressure indicated by the gauge the control box causes the valve 70 to be closed whereby no couplant 22 is being circulated. At this time the two ports may be closed and the two hoses removed. It will be seen that this provides a very quick and efficient filling of the tire.

If the wheel has only the one port 24 (FIGURE 2) the adapter 84 may be used to interconnect the two hoses 62 and 76 to the single port 24. The two separate valves 86 and 88 may then be manually manipulated to duplicate the filling operation described above. More particularly both valves 86 and 88 are opened when the valve 80 is open. This will produce a high vacuum within the tire 18 and remove all of the air. Next the valve 70 is opened and valve 86 closed. This will cause the tire 18 to be filled with the couplant 22. If desired, the valve 88 may be closed and valve 86 opened whereby any air and liquid couplant 22 is removed from the tire 18. This purging operation of filling and emptying may be repeated several times by alternately opening and closing valves 86 and 88 until all of the air bubbles are completely removed from the tire 18. Following this the tire is filled to capacity and the port 24 closed and the adapter 84 removed.

It can be appreciated this apparatus and method permits a very rapid and accurate filling of the tire 18 with a liquid couplant 22. Of equal or even greater importance all of the air which may have been present within the wheel search unit 12 is completely removed before the tire 18 is finally filled with the liquid couplant 22. Moreover the couplant 22 has substantially all of the gases therein removed before it is placed in the tire 18. It has been found a liquid couplant having air dissolved therein tends to absorb and/or reflect ultrasonic energy even though no bubbles are present. This degrades the results of the test by producing large amounts of noise and/or low amplitude signals. After the liquid couplant is vacuumed and/or heated substantially all of the dissolved gases are removed whereby strong signals with little or no noise are provided. Moreover even though the wheel search unit may be allowed to stand for extended periods of time no bubbles will form inside of the tire 18. In fact it has been found that since substantially all of the gases have been removed from the couplant 22 it is capable of reabsorbing a substantial amount of air before any bubbles will develop. Thus, even though a few small bubbles may be left in the wheel at the conclusion of the filling operation, the bubbles will be absorbed into the liquid and disappear.

While only a single embodiment of the present invention has been disclosed herein, it will be readily apparent to persons skilled in the art numerous changes and modifications may be made thereto without departing from the scope of the invention. Accordingly, the foregoing disclosure and description thereof are for illustrative purposes only and do not in any way limit the invention which is defined only by the claims which follow.

I claim:

1. The method of filling a wheel search unit having an ultrasonic transducer mounted on a center hub and surrounded by a collapsible resilient tire with an ultrasonic liquid couplant, said method including the steps of
   accumulating a supply of liquid couplant in a storage tank,
   subjecting the liquid couplant in said storage tank to a vacuum of sufficient magnitude to remove the gases from the liquid couplant in said tank,
   heating the liquid couplant in said tank to a sufficient temperature to remove substantially all of the gases from the liquid couplant,
   coupling said tank to said wheel,
   removing the gases from within said wheel whereby said tire is substantially completely collapsed,
   transferring said liquid couplant from the tank into said wheel whereby said wheel is filled with said liquid couplant.

2. The method of claim 1 and further comprising the step of circulating the liquid couplant back and forth between the storage tank and the wheel.

3. An apparatus for filling an ultrasonic wheel search unit with a liquid couplant, said apparatus including the combination of
   storage means for storing a quantity of the liquid couplant,
   means for evacuating said ultrasonic wheel search unit of gases before transferring said liquid couplant between the storage means,
   transfer means for transferring said stored liquid couplant between the storage means and the evacuated wheel search unit, and
   vacuum means for subjecting the liquid couplant in said storage means to a vacuum sufficient to remove substantially all of the gases from the couplant.

4. The apparatus of claim 3 including
   means for heating the liquid couplant in said storage means to a sufficient temperature to remove substantially all of the gases from the liquid couplant.

5. The apparatus of claim 3 wherein the vacuum means includes
   a vacuum pump coupled to said storage means for creating a vacuum in said storage means whereby the liquid couplant in the storage means is subjected to said vacuum before it is transferred into the wheel search unit,
   said vacuum pump being effective to remove the gases from within the wheel search unit before the liquid couplant is transferred into the wheel search unit.

6. An apparatus for filling an ultrasonic wheel search unit having an ultrasonic transducer mounted on a center hub and surrounded by a collapsible resilient tire, said apparatus including the combination of
   a sealed tank for storing a quantity of said liquid couplant therein,
   a vacuum pump for creating a vacuum in said tank of sufficient magnitude to remove the gases from the liquid couplant, and
   transfer means for coupling said tank to said wheel search unit, said transfer means including a pump for transferring said liquid couplant between said storage tank and the wheel search unit.

7. The apparatus of claim 6 wherein said transfer means includes
   at least one hose for being connected to the wheel search unit whereby said wheel search unit is subjected to the vacuum in the storage tank and the tire is at least partially collapsed before the liquid couplant is transferred from said tank into said wheel search unit.

8. The apparatus of claim 6 wherein the transfer means includes
   an input hose and an output hose for extending between the storage tank and the wheel search unit,
   said pump means being coupled to the input hose for circulating the liquid couplant from said tank into said wheel search unit,
   said output hose extending from the wheel search unit to the storage tank for exposing the wheel search unit to said vacuum and removing the liquid couplant therefrom.

9. The apparatus of claim 6 including
   means for heating the liquid couplant in said tank to a sufficient temperature to remove the gases from the couplant.

10. The method of filling an ultrasonic wheel search unit with a liquid couplant including the steps of:
providing a stored supply of liquid couplant;
removing substantially all gases from the stored liquid couplant by subjecting the stored liquid to a vacuum and elevated temperature of sufficient magnitudes;
evacuating the wheel search unit of all gases; and
filling the evacuated wheel search unit with the degassed liquid couplant.

References Cited

UNITED STATES PATENTS

| | | | |
|---|---|---|---|
| 3,325,974 | 6/1967 | Griffin et al. | 55—193 X |
| 3,344,584 | 10/1967 | Kehoe et al. | 55—192 X |
| 3,411,270 | 11/1968 | Cornelius et al. | 55—193 X |
| 2,434,365 | 1/1948 | McMahan | 141—61 |

HOUSTON S. BELL, Primary Examiner

U.S. Cl. X.R.

141—11, 61, 82; 55—40, 189